US008910565B2

(12) United States Patent
Reeser et al.

(10) Patent No.: US 8,910,565 B2
(45) Date of Patent: Dec. 16, 2014

(54) BATCH COOKER

(75) Inventors: Devin Reeser, Portland, OR (US); David Rueter, Newberg, OR (US)

(73) Assignee: PPM Technologies, LLC, Newberg, OR (US)

(*) Notice: Subject to any disclaimer, the term of this patent is extended or adjusted under 35 U.S.C. 154(b) by 799 days.

(21) Appl. No.: 13/038,226

(22) Filed: Mar. 1, 2011

(65) Prior Publication Data
US 2011/0287154 A1 Nov. 24, 2011

Related U.S. Application Data

(60) Provisional application No. 61/309,299, filed on Mar. 1, 2010.

(51) Int. Cl.
*A47J 37/12* (2006.01)

(52) U.S. Cl.
CPC .......... *A47J 37/1233* (2013.01); *A47J 37/1266* (2013.01); *Y10S 210/08* (2013.01)
USPC ...... 99/330; 99/408; 210/167.28; 210/DIG. 8

(58) Field of Classification Search
USPC ............... 99/330, 408, 403, 407; 210/167.28, 210/DIG. 8
See application file for complete search history.

(56) References Cited

U.S. PATENT DOCUMENTS

| 3,376,806 A * | 4/1968 | Magnusson ..................... 99/408 |
| 3,701,313 A | 10/1972 | Boggs |
| 4,084,492 A * | 4/1978 | Sullivan ........................... 99/330 |
| 4,328,097 A * | 5/1982 | Whaley et al. ........... 210/167.28 |
| 4,623,544 A | 11/1986 | Highnote |
| 4,882,984 A * | 11/1989 | Eves, II ........................... 99/404 |
| 5,243,898 A * | 9/1993 | Sakuma ........................... 99/408 |
| 5,379,683 A | 1/1995 | Ejiri |
| 5,575,194 A | 11/1996 | Maher, Jr. |
| 5,865,102 A * | 2/1999 | Haraldsson et al. ............ 99/408 |
| 6,067,899 A | 5/2000 | Caridis |
| 8,111,979 B2 * | 2/2012 | Feinberg et al. .............. 392/463 |
| 8,551,331 B2 * | 10/2013 | Burkett et al. ........... 210/167.28 |

FOREIGN PATENT DOCUMENTS

WO 2004/019743 A1 3/2004

OTHER PUBLICATIONS

International Search Report and Written Opinion mailed Jun. 10, 2011, issued in corresponding International Application No. PCT/US2011/026697, filed Mar. 1, 2011, 9 pages.

* cited by examiner

*Primary Examiner* — Reginald L Alexander
(74) *Attorney, Agent, or Firm* — Alleman Hall McCoy Russell & Tuttle LLP

(57) ABSTRACT

Batch cookers, as well as methods for cooking using the batch cookers, are provided. A batch cooker comprises a cooking trough configured to hold a volume of heated cooking oil. An oil recirculation system delivers heated cooking oil from an external heat source (e.g., a heat exchanger) to the cooking trough through a series of valves and inlets. After use in cooking, used cooking oil is drained from the cooking trough and filtered (e.g., using a drum filter) before being recirculated into the heat source for reuse in subsequent cooking cycles. One application for the batch cooker of the present disclosure is to cook kettle-style potato chips. Accordingly, the batch cooker is configured to facilitate the multiple cooking temperatures required to produce kettle chips.

13 Claims, 12 Drawing Sheets

BATCH COOKER

CROSS-REFERENCE TO RELATED APPLICATION

This application claims the benefit of U.S. Provisional Application No. 61/309,299, filed Mar. 1, 2010, the disclosure of which is incorporated herein by reference in its entirety.

BACKGROUND

Typically, kettle chips are thicker than standard potato chips and cooked in individual batches in a kettle-type vessel filled with heated oil. The oil is typically heated by applying a flame or other heating system beneath the kettle. Sliced potatoes are dumped into the kettle and cooked until crisp and then removed. During the cooking process, the potato slices may be stirred by hand or by a mechanized system.

One aspect of cooking kettle-style potato chips is a cooking temperature profile in the shape of an "inverse bell curve," wherein the temperature decreases upon addition of the raw potato slices and then gradually increases to a steady cooking temperature. Such an inverse bell curve temperature profile is accomplished in traditional kettle-style cooking methods by simply adding raw potato slices to heated oil. The cool temperature of the raw potato slices, as well as the moisture contained within the potato slices, results in a decrease of the temperature of the cooking oil, so as to produce the minimum temperature of the inverse bell curve. The constant flame heating of the kettle containing the cooking oil eventually reheats the oil to the original temperature, thereby completing the inverse bell temperature profile.

One drawback of present kettle-type cooking systems is that over time residue accumulates in the oil, thereby degrading it. Also, the oil is not always heated uniformly, with hot spots occurring that degrade the oil. In addition, although typically an exhaust hood is used over the kettle, the hood is spaced above the kettle so oxygen from the air reacts with the oil and degrades it.

What is needed, therefore, is an improved cooker for producing kettle-type potato chips whereby the oil is uniformly heated without degradation so as to produce a more consistent and efficient cooking system.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In a first aspect, a batch cooker is provided, comprising:
a cooking trough configured to hold a volume of heated cooking oil; and
an oil recirculation system in fluid communication with the cooking trough, comprising:
  a heat exchanger configured to heat cooking oil flowing through the heat exchanger,
  an oil inlet circuit intermediate, and in fluid communication with, the heat exchanger and the cooking trough,
  one or more inlet valves intermediate, and in fluid communication with, the oil inlet circuit and the cooking trough, each inlet valve being configured to control the amount of oil passing from the circuit to the cooking trough,
  one or more oil outlets configured to remove oil from the cooking trough,
  an oil outlet circuit in oil flow communication with said oil outlets,
  an oil filter intermediate, and in fluid communication with, the oil outlet circuit and the heat exchanger,
  a bypass valve in fluid communication with the oil inlet circuit, said bypass valve being configured to control the amount of oil passing from the oil inlet circuit, through a bypass conduit, and to the oil outlet circuit without passing through the cooking trough, and
  an oil pump configured to pump oil through the oil recirculation system.

In another aspect, a method is provided for cooking potato slices using a system comprising the batch cooker of the first aspect, means for providing raw potato slices to the batch cooker, and means for removing cooked potato slices from the batch cooker, the method comprising:
  (a) delivering raw potato slices into a volume of cooking oil in the cooking trough, wherein said volume of cooking oil is heated by a heat exchanger to a first temperature;
  (b) decreasing the temperature of the volume of cooking oil to a second temperature when the raw potato slices are delivered into the volume of cooking oil;
  (c) increasing the temperature of the volume of cooking oil to a third temperature to provide cooked potato slices after a cooking period; and
  (d) removing the cooked potato slices from the volume of cooking oil using the means for removing cooked potato slices from the cooking trough, to provide cooked kettle chips.

In another aspect, a method is provided for cooking kettle chips, comprising:
  a) delivering heated cooking oil to an elongated cooking trough, said cooking oil being heated by a heat supply positioned at a location distal from the cooking trough;
  b) delivering raw potato slices into the cooking oil in the elongated cooking trough with the cooking oil heated to a first temperature;
  c) decreasing the temperature of the cooking oil in the cooking trough to a second temperature when the raw potato slices are delivered to the cooking trough by altering the flow of cooking oil to the cooking trough;
  d) increasing the temperature of the cooking oil in the cooking trough to a third temperature to provide cooked potato slices after cooking, by altering the flow of heated cooking oil to the cooking trough; and
  e) removing the cooked potato slices from the cooking oil in the cooking trough, thereby to provide cooked kettle chips.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1A:
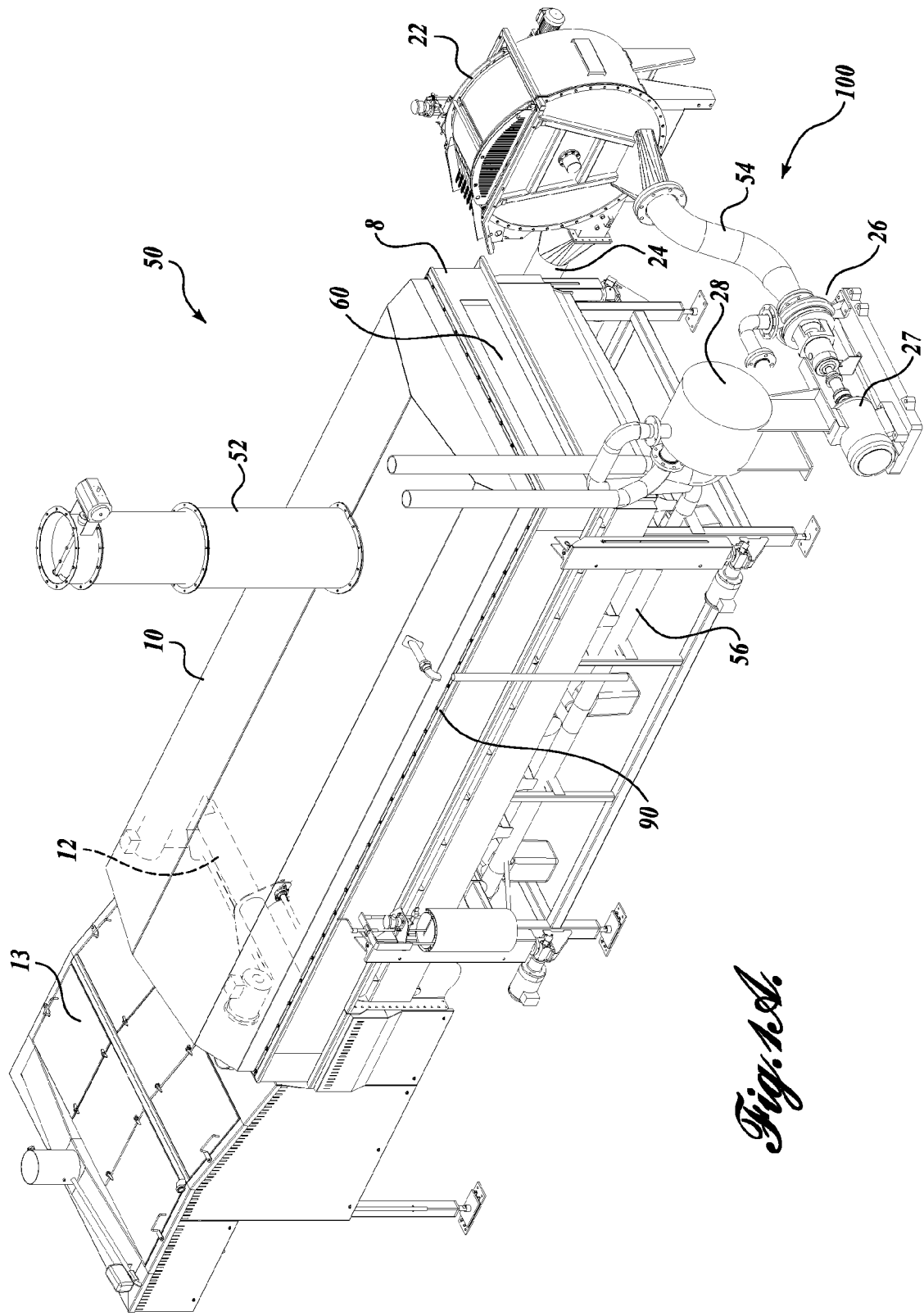
FIG. 1A is an isometric view of a batch cooker in accordance with the embodiments disclosed herein.

The embodiments provided herein disclose a batch cooker (or "fryer"), as well as a method for cooking using such a batch cooker. One particular application for the batch cooker of the present disclosure is to cook kettle-type potato chips ("kettle chips"). It will be appreciated by those of skill in the art that kettle chips are distinct from typical potato chips in that they consist of a thicker slice of potato and additionally have a harder "bite" than typical potato chips. In order to produce the distinct qualities of kettle chips compared to potato chips, kettle chips are cooked in a different manner than traditional potato chips.

As set forth above, presently implemented kettle-frying systems ("kettle cookers") used to cook kettle chips have several drawbacks. These drawbacks include residual accumulations over time in the cooking oil, thereby degrading the oil. Additionally, a lack of uniform heating of the oil results in hot spots occurring during cooking that degrade the oil. Finally, because present kettle cookers are exposed to open air, even though an exhaust hood is used, oxygen from the air reacts with the oil and degrades it. It can be seen that the degradation of oil is a prominent shortcoming of present kettle cookers. Such oil degradation leads to inefficiencies in the cooking, additional expenses in replacing oil, and the potential for inferior flavored product resulting from cooking using degraded oil.

In order to address the drawbacks of present kettle cookers, and to provide further cooking improvements, the present disclosure provides embodiments that include a novel batch cooker 50. In the embodiments provided herein, the batch cooker 50 includes an elongated cooking trough 8 wherein kettle chips are cooked in heated cooking oil. The cooking trough includes an infeed 60 for providing raw potato slices to the heated cooking oil at an infeed (or proximal) end of the trough. During cooking, a stirrer 12 agitates the cooking potato slices as it moves along the longitudinal length of the cooking trough 8. Cooked kettle chips are removed from the cooking trough 8 by a removal conveyor 13.

Heated cooking oil is provided to the elongated cooking trough 8 by an oil flow system 100. The oil flow system 100 includes a heat exchanger 28 that heats cooking oil exterior from the cooking trough 8. Heated cooking oil is provided to the cooking trough through a plurality of oil inlets 94. Oil is removed from the cooking trough through a plurality of oil outlets 82, 84, and 86. Oil removed from the cooking trough 8 travels to an oil filter 22 that removes residues, impurities, and the like from oil that has been used for cooking, and allows such oil to then be reused. Filtered oil is returned to the heat exchanger 28 for reheating and reuse in further cooking cycles.

The batch cooker and related method provided herein are described in relation to cooking kettle-style potato chips. However, it will be appreciated that the disclosure is not limited only to the cooking of kettle chips made from potatoes, but can be used on any suitable feedstock. For example, alternatives to kettle chips made from potatoes include kettle chips made from vegetables such as yams, sweet potatoes, and the like.

Additionally, a very specific configuration of a batch cooker 50 is described herein, although it will be appreciated that the scope need not be limited to the arrangement of components disclosed in the representative batch cooker 50 described herein. In this regard, the shape, positioning, and arrangement of the different parts of the batch cooker 50 need not be exactly as described, so long as the function of the batch cooker 50 is operable under the required conditions to produce the results described herein. For example, an oil pump 26 is described herein as being intermediate the drum filter 22 in the heat exchanger 28, although variations of this arrangement are also contemplated in alternative embodiments.

Figure 1B:
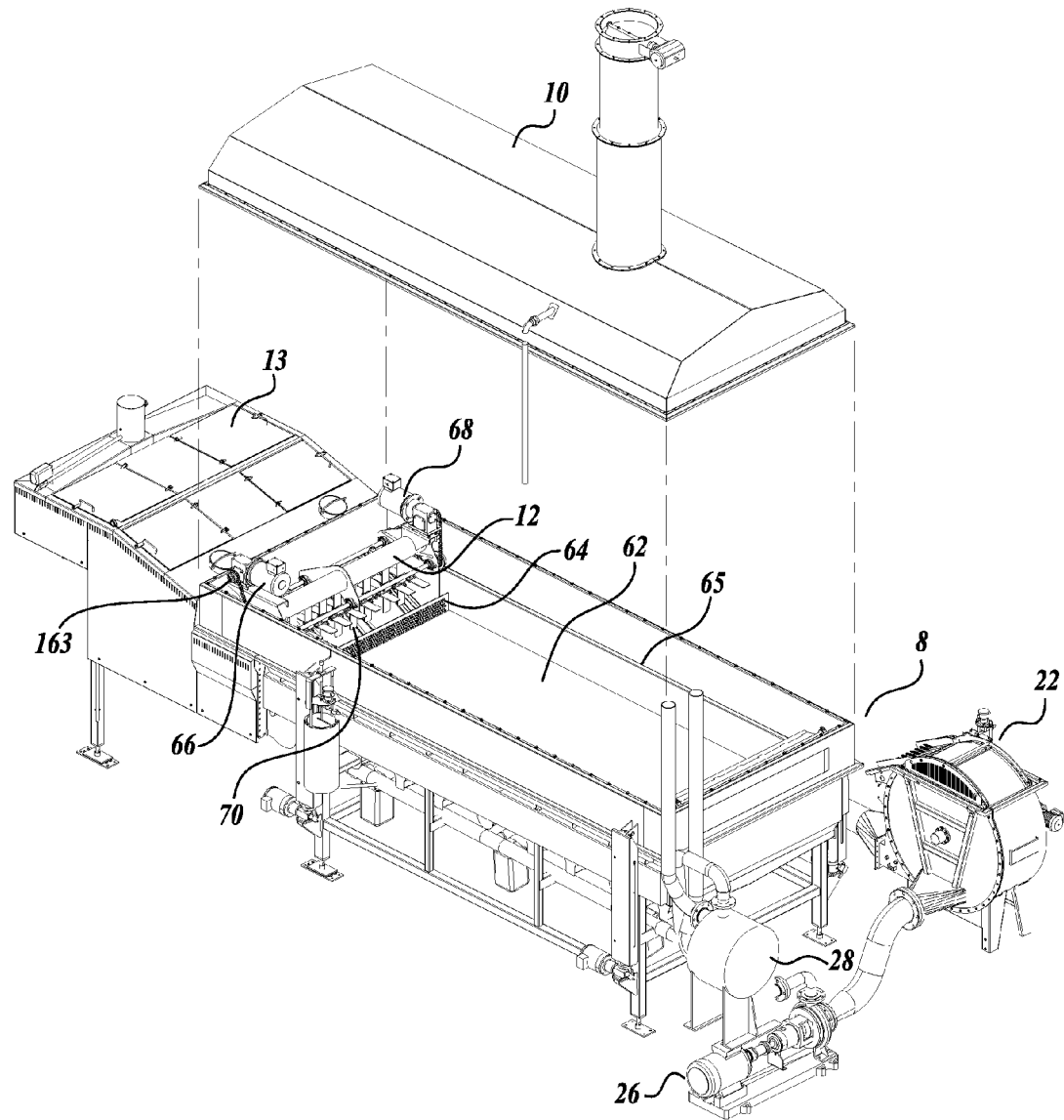
FIG. 1B is a view similar to FIG. 1A, but with the hood removed upwardly from the cooking trough.

A representative batch cooker 50 will now be described with reference to the FIGURES. The batch cooker 50 includes a hood 10 disposed over an elongated cooking trough 8. The cooking trough is illustrated as an elongated trough structure mounted on an underlying frame. The trough has a flat bottom or bed 62, and upstanding sidewalls 63 that extend upwardly from the bottom. A sill or landing 65, illustrated in FIG. 1B, extends along the interior of the longitudinal sidewalls 63. When the hood is closed, the cooking trough 8 and hood form a hood seam 11 that allows for the buildup of steam above the surface of oil within the cooking trough, a process that blocks oxygen from reaching the oil and thereby prevents oil degradation via oxidation, a common problem with traditional kettle cookers. The hood 10 is vented controllably by an exhaust stack 52. In certain embodiments, the hood 10 is retractable or pivotable relative to the trough. FIG. 1B illustrates the retractable hood 10 removed upwardly so as to expose the cooking trough 8. The trough 8 and hood 10 are preferably made from stainless steel. For example, Stainless Steel 304 or 316.

Figure 3:
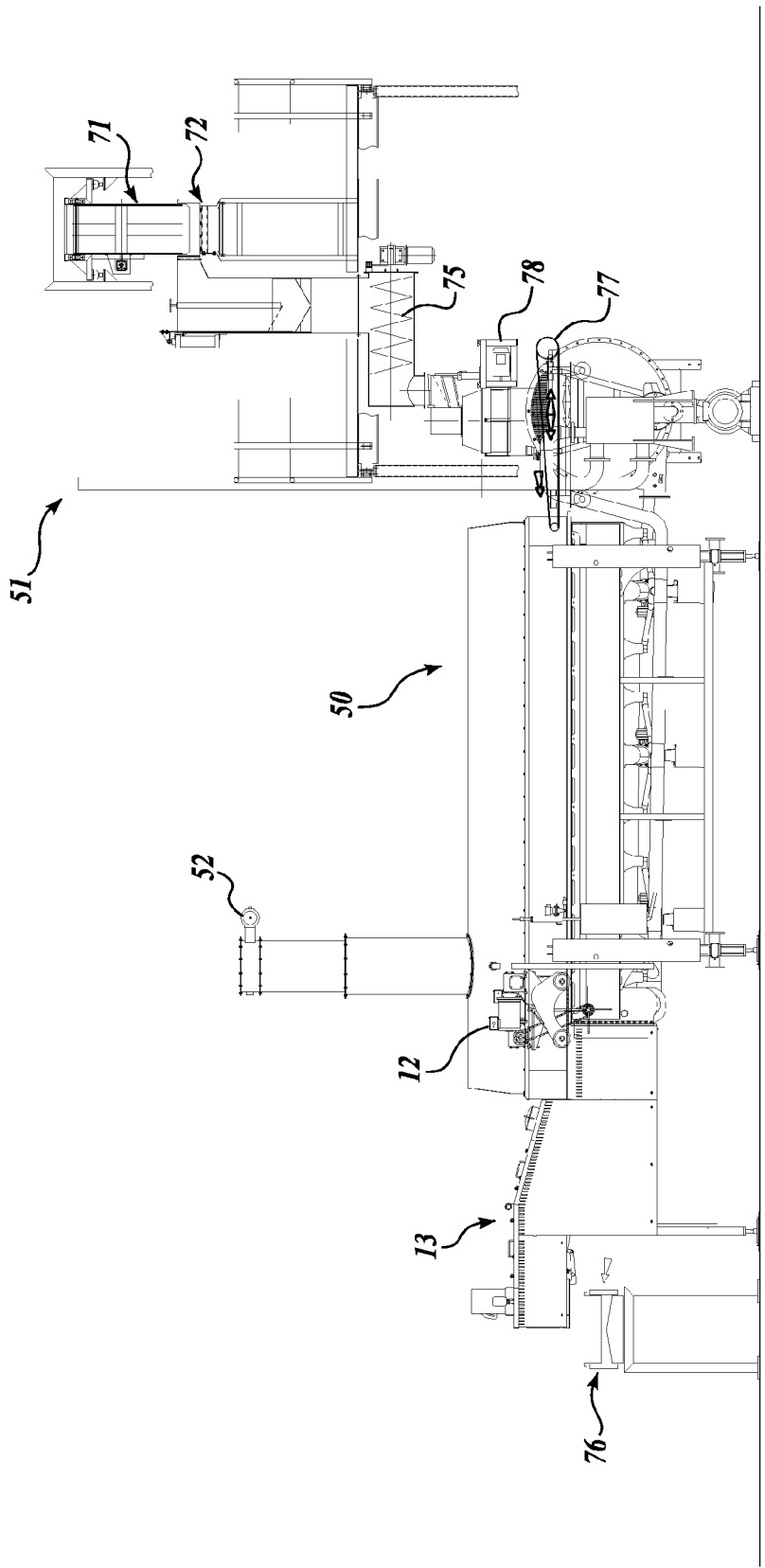
FIG. 3 is an elevation view of one of the batch cookers illustrated in FIG. 2, specifically illustrating an infeed delivery system by which potatoes are fed into a batch cooker.
Figure 4:
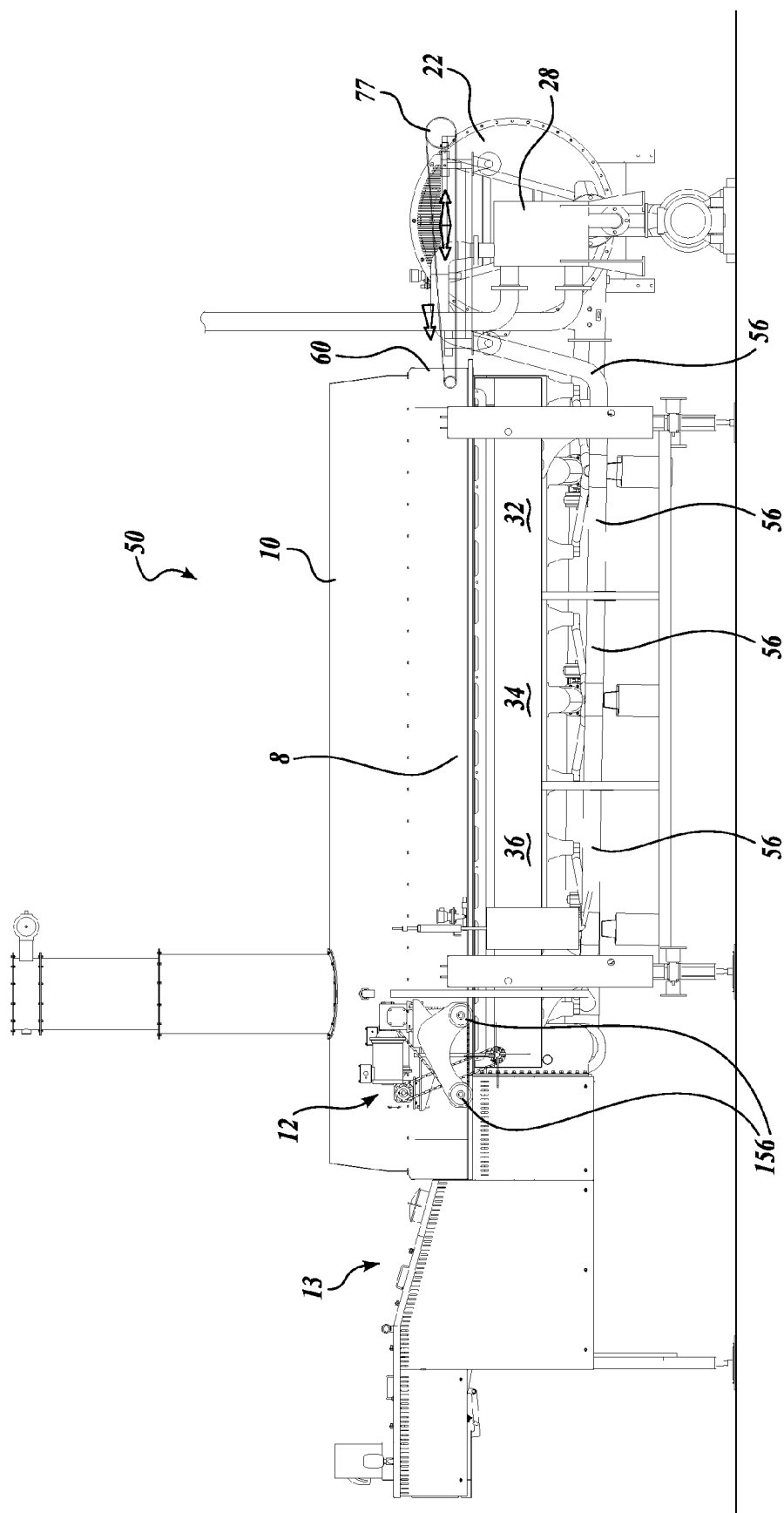
FIG. 4 is an elevation view of a batch cooker, such as that shown in FIG. 3, but with the feed system removed.

An infeed 60 is provided at a proximal end of the elongated cooking trough 8. Feedstock, such as raw potato slices, is introduced into heated cooking oil in the cooking trough 8 via the infeed 60. The infeed 60 may be a slidable, rotatable, or other type opening mechanism known to those of skill in the art. The infeed 60 can also be interfaced with a conveyor belt 77, such as illustrated in FIGS. 3 and 4, to provide high speed and automated input of feedstock into the batch cooker 50.

A removal conveyor 13 is provided at the distal end of the elongated cooking trough 8. At the end of a cooking cycle, the removal conveyor 13 allows for cooked chips to be removed from the cooking trough 8 for post-cooking processing, such as drying, flavoring, etc. The removal conveyor is preferably a mesh or other porous configuration that allows for oil to drop from cooked chips as they travel on the conveyor. The conveyor and underlying structure are preferably inclined and configured to allow for shed oil from the cooked chips traveling on the conveyor to be directed into removal outlet 80.

The elongated cooking trough 8 includes a bed 62 and a perforated gate 64 across the distal end of the trough. In certain embodiments, the bed is connected to the oil circulation system by providing fluid communication between the cooking trough 8 and oil inlets and oil outlets (not illustrated in FIG. 1B). The gate 64 is movable to allow for cooked kettle chips to be removed from the cooking trough 8 upon the completion of a cooking cycle. Accordingly, the gate 64 is configured to move (e.g., rotate) so as to lie down in the plane of the cooking trough and allow the cooked kettle chips to travel from the bed 62 to the removal conveyor 13 on completion of a cooking cycle.

Figure 7:
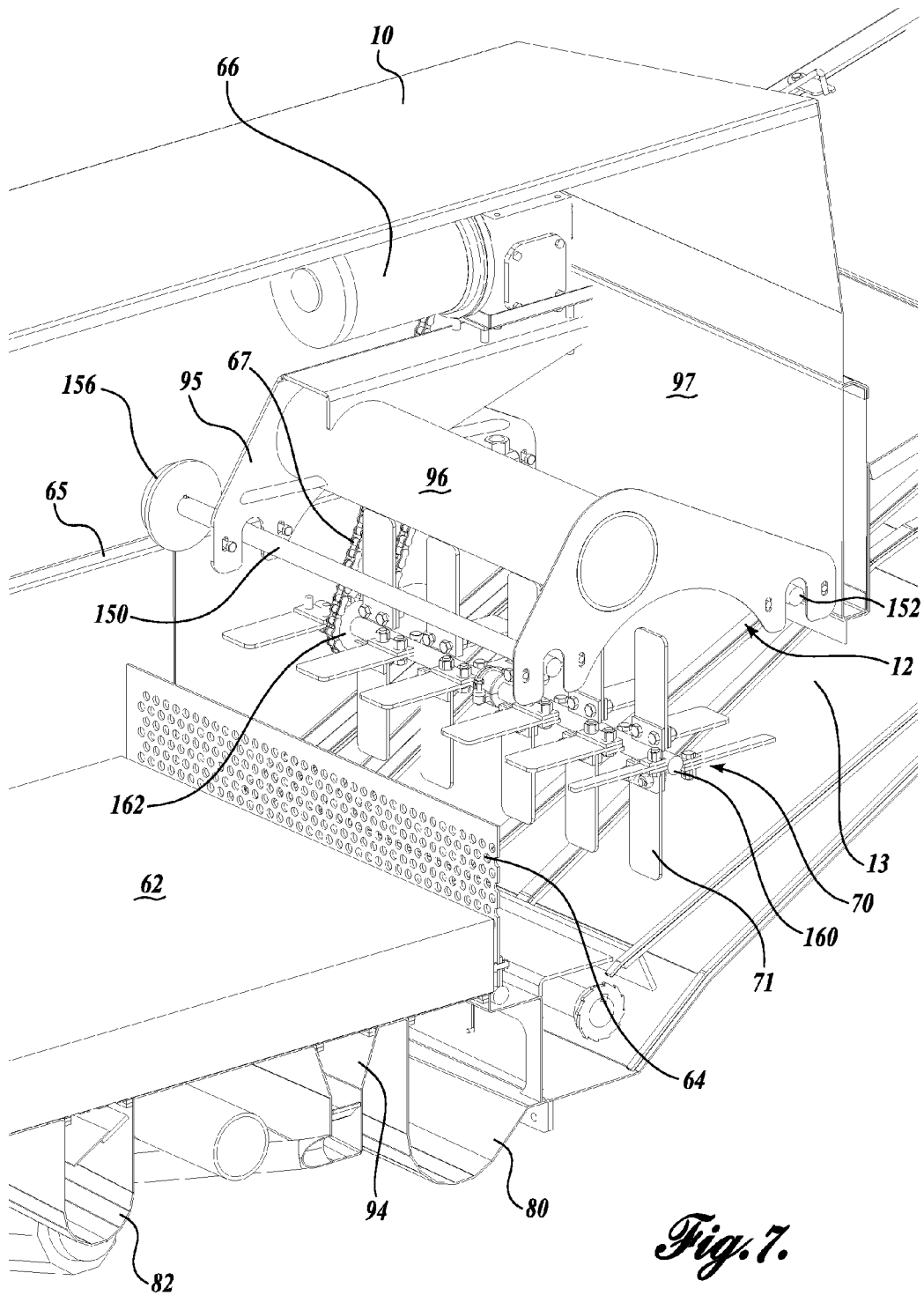
FIG. 7 is a cross-sectional view of a detailed portion of the batch cooker illustrating the discharge end, in accordance with the embodiments provided herein.

The batch cooker 50 includes a stirrer 12 configured to agitate and direct the movement of cooking chips inside the batch cooker 50. Referring particularly to FIGS. 1B and 7, the stirrer 12 is illustrated, including a paddle rake 70, as well as a paddle rake motor 66 that provides rotational energy to the paddle rake 70. The stirrer 12 includes a frame structure having side panels 95 fixed to opposite ends of a crosstube 96 and also fixed to a rear panel 97. Two axels 150 and 152 span across the lower portions of the side panels 95, with support wheels 156 attached to the ends of the axels 150 and 152. The support wheels 156 ride along the sill 65 when traversing the length of the elongated cooking trough 8 so as to agitate and stir cooking chips.

A drive motor 68 is mounted above the crosstube 96 at one end thereof to drive one or both of the axels thereby to move the stirrer 12 fore and aft along the trough 8. In this regard, the stirrer 12, including the paddle rake 70, agitates and moves the cooking chips during cooking, and also facilitates removal of the cooked chips after a cooked cycle is complete. The paddle rake 70 includes a plurality of paddles mounted to, and extending radially from, a cross shaft 160. The paddle rake 70 is rotated by the paddle rake motor 66, which drives a chain 67 attached to a sprocket 162 on the cross shaft 160 and a sprocket 163 attached to the motor 66.

It will be appreciated that the paddle rake 70 is one embodiment of a mechanism useful for agitating and moving cooking potato chips, although additional embodiments are also contemplated.

The paddle rake 70, in certain embodiments, can be rotated in both forward and backward directions. In the context of the batch cooker 50, forward motion is defined as movement of the paddles 71 of the paddle rake 70 in a counterclockwise direction, according to the point of view illustrated in FIG. 1B. Similarly, when the paddle rake 70 is run "backwards" the paddles of the paddle rake 70 move in a clockwise motion according to the perspective of FIG. 1B.

During an exemplary kettle chip cooking process, the stirrer 12 rotates the paddle rake 70 forward along the longitudinal length of the cooking trough 8. Upon completion of the cooking cycle, the stirrer 12 is positioned at the infeed end of the cooking trough 8 and the paddle rake 70 is rotated backwards, which has the effect of pushing the chips towards the removal end of the cooking trough 8. The movement of chips towards the removal (or distal) end may be facilitated by the closing of any outlets (e.g. 82, 84, and 86) from the cooking trough such that the only outlet for cooking oil is the removal oil outlet 80 at the removal end of the cooking trough 8. Accordingly, the cooking oil flows towards the removal end of the cooking trough, along with the cooked chips. The removal conveyor 13 is positioned above the removal oil outlet 80 and the cooking oil flows through the mesh of the removal conveyor 13 such that the cooked chips are deposited on the removal conveyor 13 and moved away from the cooking trough. Eventually, all of the cooking oil may be drained from the cooking trough 8 for cleaning and reheating prior to use in another batch cooking cycle.

Figure 5:
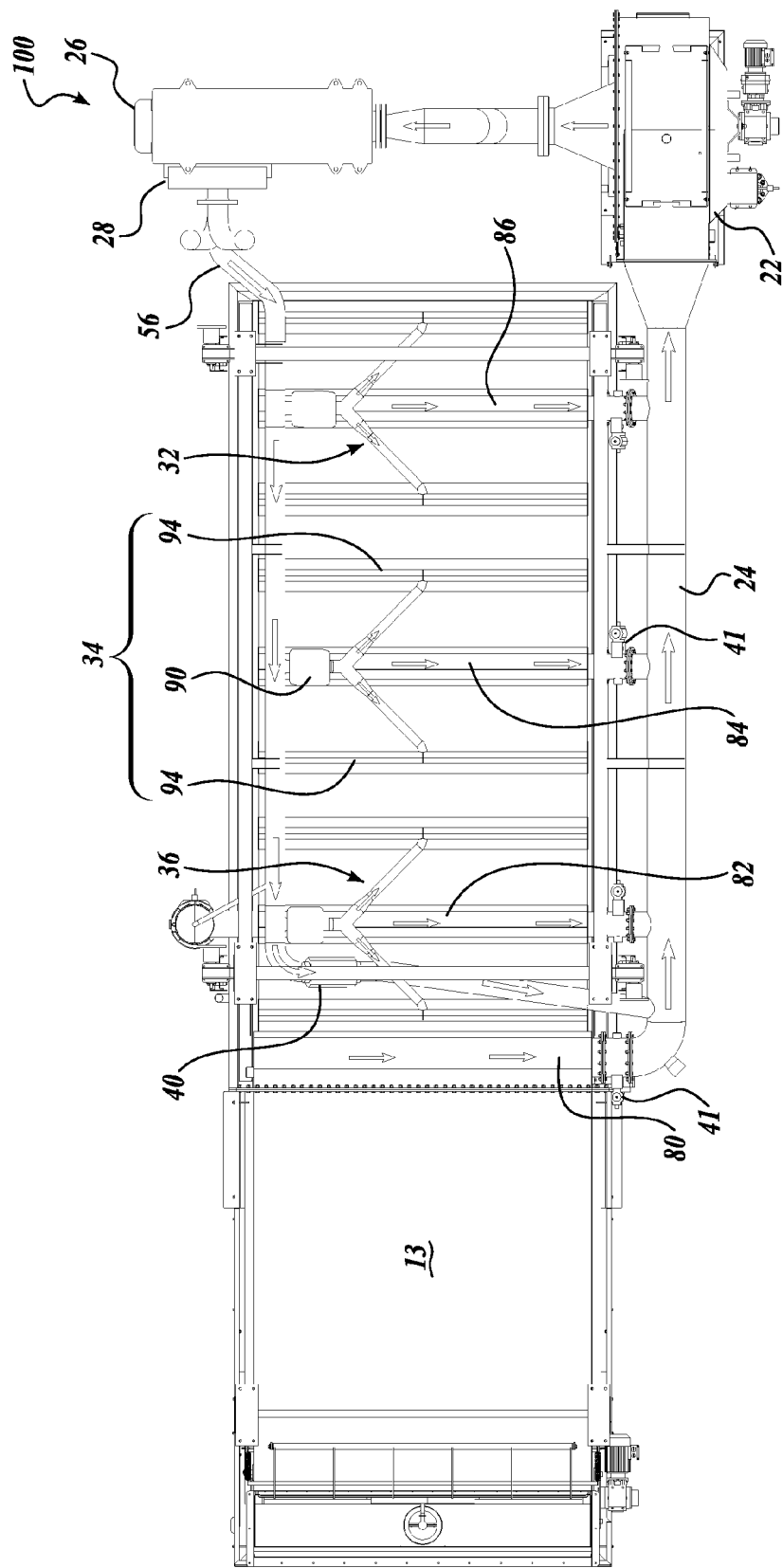
FIG. 5 is a bottom view of a representative batch cooker in accordance with the embodiments herein, illustrating, specifically, a cooking oil flow system.
Figure 6:
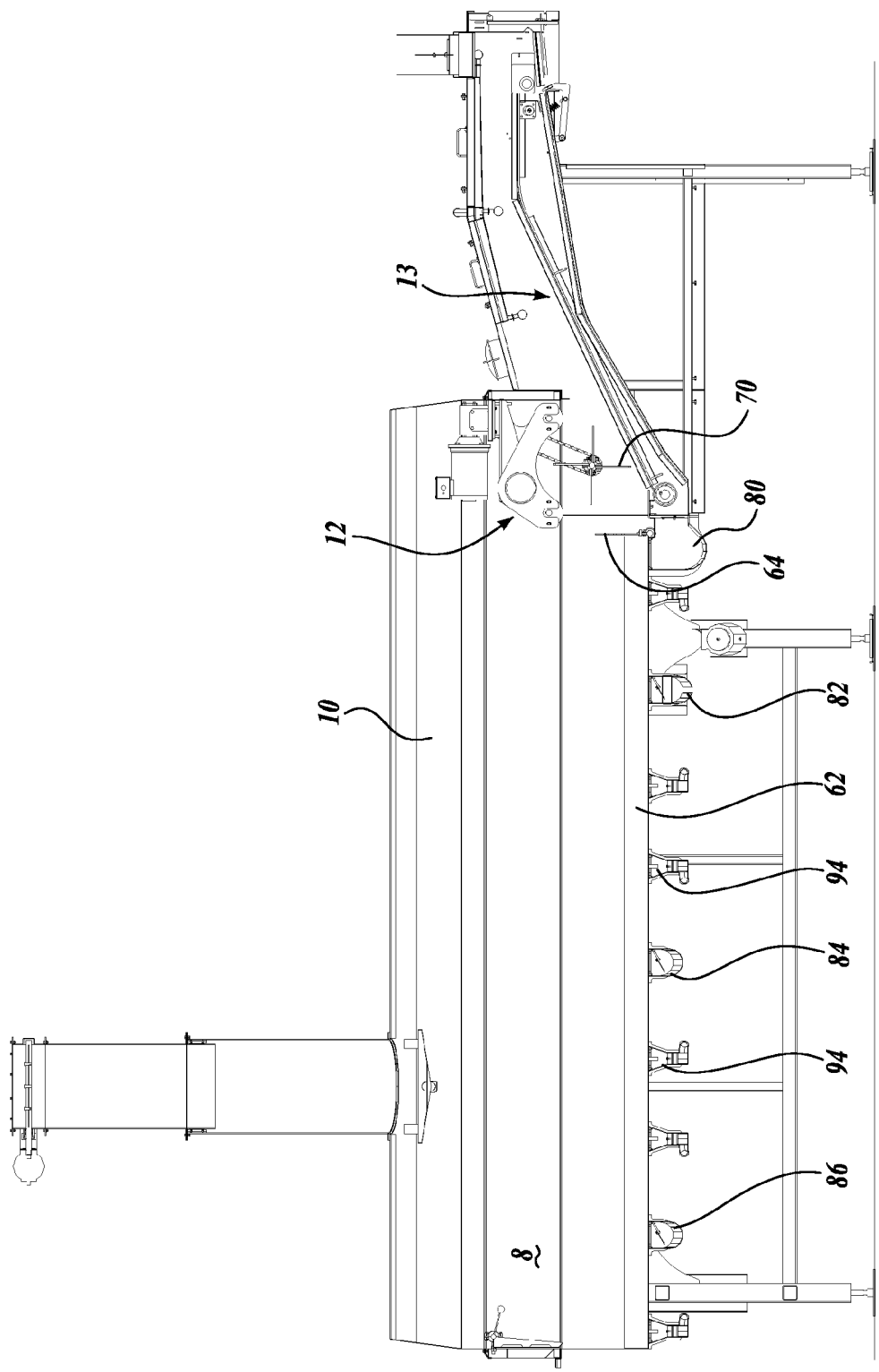
FIG. 6 is a longitudinal cross-sectional view of an exemplary batch cooker in accordance with the embodiments provided herein.

Referring specifically to FIGS. 4 and 5, the oil flow system 100 will now be described in more detail. In the embodiment of the batch cooker 50 illustrated in FIGS. 4 and 5, the batch cooker 50 includes three cooking zones, a first (proximal) cooking zone 32, a second (intermediate) cooking zone 34, and a third (distal) cooking zone 36. Each of these cooking zones is defined by features allowing for temperature control of the zone so as to optimize the cooking process and to account for local variations in oil temperature during the cooking process.

Referring to FIG. 5, an underside view of the batch cooker 50 is illustrated. The oil flow system 100 includes a pump 26 driven by a motor 27 configured to pump heating oil first through a heat exchanger 28 and then into an oil inlet circuit 56. Heat exchangers, drum filters, and oil pumps are known to those of skill in the art. A preferred drum filter is the CFF-500 made by PPM Technologies LLC (Newberg, Oreg.).

While a heat exchanger is described in this exemplary embodiment, it will be appreciated that other distal heating sources are also contemplated, for example heaters using thermal oil and steam to heat the cooking oil.

The oil inlet circuit 56 is in fluid communication with each of the cooking zones 32, 34, and 36, as well as a bypass valve 40.

The second cooking zone 34 will now be described in more detail, although it will be appreciated that in the batch cooker 50 illustrated in FIG. 5, the first, second, and third cooking zones 32, 34, and 36, respectively, have similar features and, therefore, the description of the second cooking zone 34 applies equally to the first cooking zone 32 and the third cooking zone 36.

Figure 11:
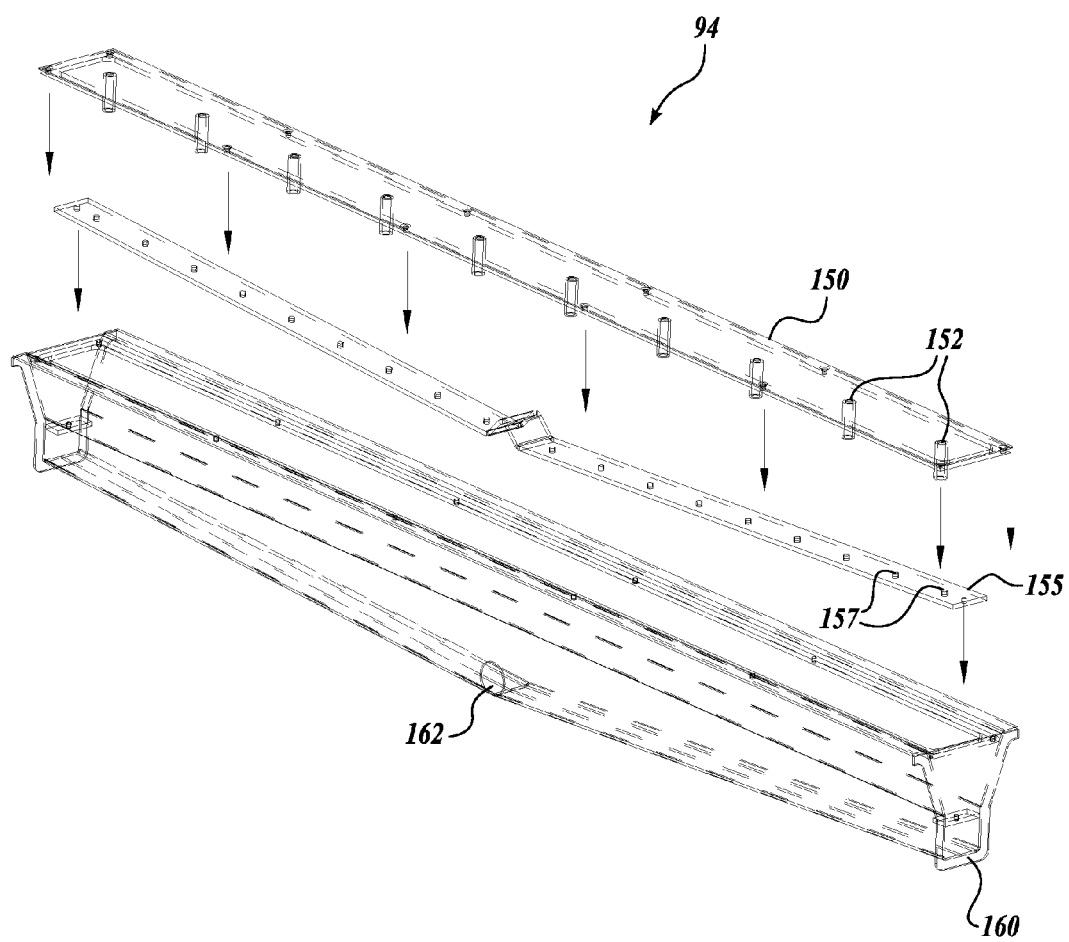
FIG. 11 is an exploded view of a representative oil inlet useful in the provided embodiments.

The second cooking zone 34 includes an inlet valve 90 in fluid communication with the oil inlet circuit 56. The inlet valve 90 controls the amount of oil, if any, passing from the oil inlet circuit 56 into a plurality of oil inlets 94. The oil inlets 94 are sized and configured to provide heated oil to the cooking trough 8 through inlet openings. An oil inlet 94 assembly is illustrated in FIG. 11. The oil inlet 94 is configured to integrate into the cooking trough 8 such that a top plate 150 of the inlet 94 is coplanar with the bed 62 of the cooking trough 8 (e.g., the top plate 150 is welded into the bed 62). The top plate 150 includes a plurality of pipes 152 providing fluid communication between an oil inlet trough 160 and the cooking trough 8. During operation of the batch cooker 50, oil flows from the inlet valve 90, through an opening 162 in the inlet trough 160, and through the pipes 152 into the cooking trough 8. The inlet trough 160 is symmetrically canted such that the opening 162 is at the lowest point of the inlet trough 160 such that oil flowing into the inlet trough 162 is laterally distributed evenly.

Oil flow from the oil inlet 94 into the cooking trough 8 is controlled by the inlet valve 90. Alternatively (or additionally), the oil flow may be controlled by additional valves (or other control mechanisms) within the oil inlet 94. For example, each of the pipes 152 may be controlled individually by a valve (not illustrated) to further improve local temperature control of cooking oil in the cooking trough 8.

In the embodiment of the oil inlet 94 illustrated in FIG. 11, a plate 155 having a plurality of holes 157 is suspended by brackets on the inlet trough 160. The plate functions to ensure that the heated cooking oil spreads across the full length of the inlet trough 160 before entering the elongated cooking trough 8 via the pipes 152. The plate 155 helps to homogenize the temperature of heated cooking oil entering the cooking trough 8, so as to eliminate the potential for "hot spots" in the cooking trough 8 resulting from the oil inlet 94. The plate 155 is canted at an angle similar to the inlet trough 160.

Optionally, the oil inlets 94 are positioned and configured to drive the motion of chips cooked in the cooking trough using the direction and power of the inlet oil to manipulate the travel of chips within the cooking trough 8. The oil inlets 94 are preferably nozzles (e.g., the pipes 152 are nozzles).

Figure 9:
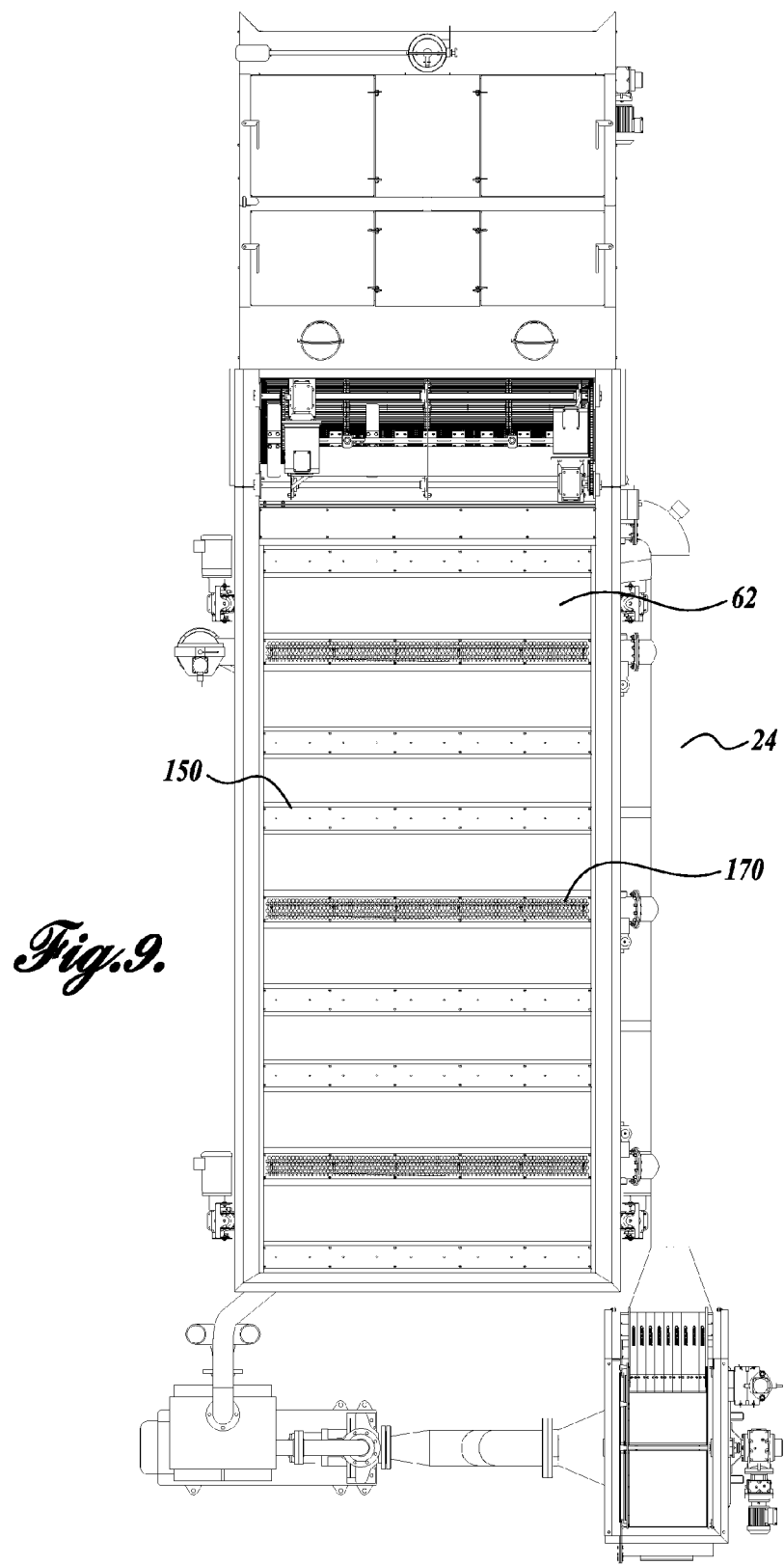
FIG. 9 is a plan view of a representative batch cooker illustrating representative positions of oil inlets and outlets in the bed of the cooking trough.

FIG. 9 is a plan view of the batch cooker illustrating the oil inlet top plates 150 through which cooking oil is pumped from the oil inlets 94. Also illustrated in FIG. 9 are oil outlet grates 170, which allow cooking oil to pass from the trough 8 to the oil outlets 82, 84, and 86. As illustrated in FIG. 9, the top plates 150 and outlet grates 170 extend laterally the width of the cooking trough 8, although it will be appreciated that such a configuration is only a representative embodiment. The oil inlets 94 and outlets (e.g., 84) need not be lateral, as illustrated, but can also be longitudinal, or any other position. The oil inlets 94 and outlets (e.g., 84) need not be positioned in the bed 62, but may be positioned on the walls of the cooking trough 8, or in other locations as long as they are able to perform the necessary functions to allow the batch cooker 50 to operate.

In the illustrated embodiment of FIG. 5, the inlet valve 90 provides heated oil from the oil inlet circuit 56 to two separate branches for oil inlets 94; although it will be appreciated that a single oil inlet could be controlled by an inlet valve 90 or multiple oil inlets 94 could be controlled by a single inlet valve 90. Additionally, it will be appreciated that a single cooking zone (e.g., cooking zone 34) could be used for an entire batch cooker 50, or two or more zones may be used. Three cooking zones 32, 34, and 36 are used in the illustrated embodiment, although the embodiments disclosed herein are not limited to such a number of cooking zones. For example, an elongated cooking trough 8 may be benefited by having four or more cooking zones, while a shortened cooking trough 8 may benefit by only utilizing one or two cooking zones.

The oil inlet circuit 56 is additionally configured to provide heated oil to a bypass valve 40. The bypass valve 40 provides a direct fluid channel from the oil inlet circuit 56 to the oil outlet circuit 24 without passing through the cooking trough 8. The bypass valve 40 is useful for controlling the temperature of the oil in the cooking trough 8 by providing an outlet for heated oil from the heat exchanger 28 that is not needed in the cooking trough 8 for the purposes of heating. For example, if the cooking oil in the cooking trough 8 is at the desired temperature for cooking, further heated oil from the heat exchanger 28 is not necessary in the cooking trough, and, therefore, the inlet valves 90 in each of the cooking zones 32, 34, and 36, could be closed and the bypass valve 40 opened so as to allow oil to continue to flow through the oil flow system 100 without raising the temperature of the oil in the cooking trough 8.

Oil exits the cooking trough 8 through oil outlets 82, 84, and 86, as well as a removal oil outlet 80. The oil outlets 82, 84, and 86 are each disposed in a single cooking zone (e.g., oil outlet 84 is disposed in the second cooking zone 34). It will be appreciated that two or more oil outlets can be utilized in a cooking zone if so desired.

Figure 10:
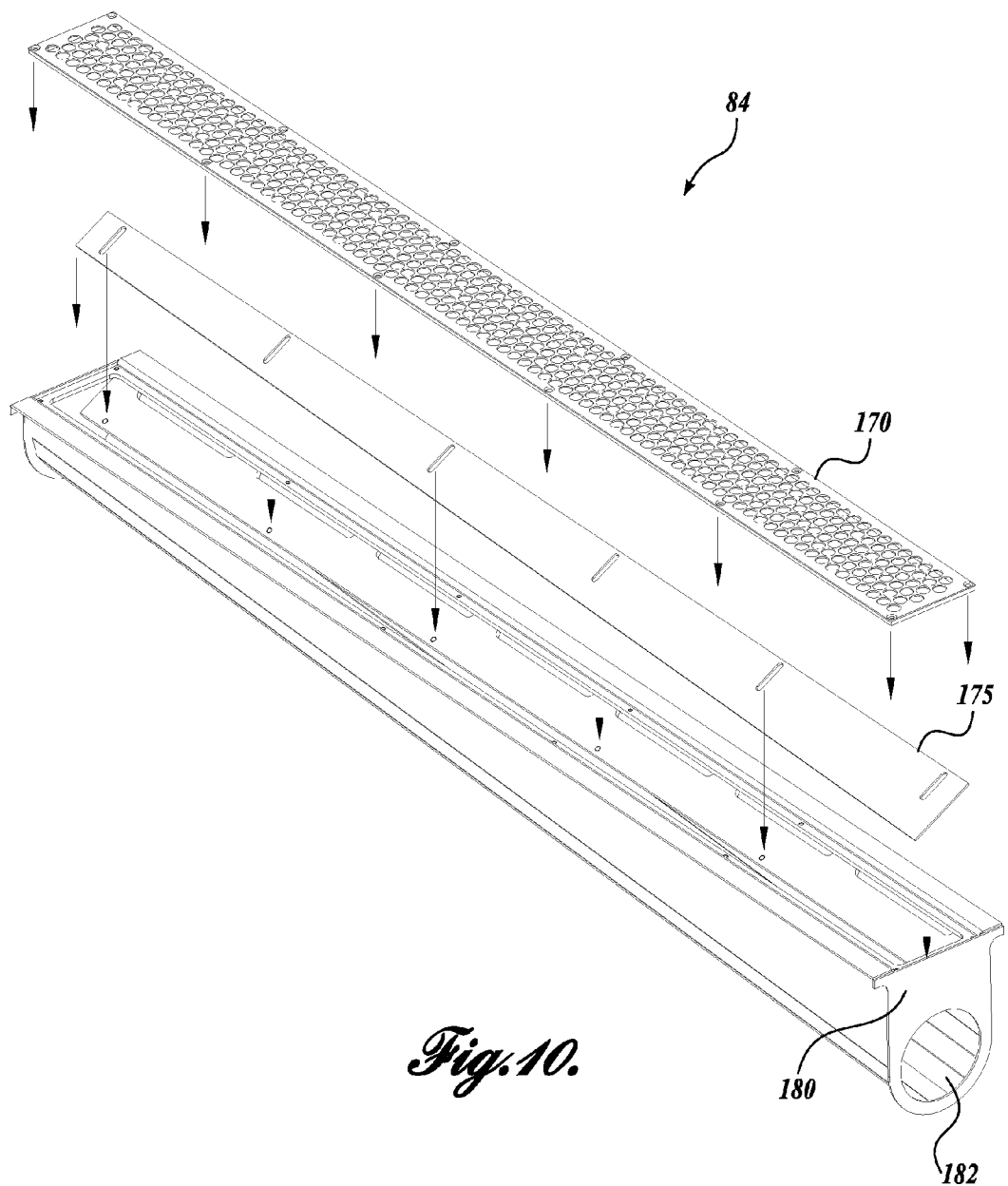
FIG. 10 is an exploded view of a representative oil outlet useful in the provided embodiments.

An exemplary oil outlet 84 assembly is illustrated in FIG. 10. An outlet grate 170 allows cooking oil to flow from the cooking trough 8 into an outlet trough 180 and into the outlet circuit 24 via opening 182. The outlet trough 180 is sloped in shape such that, when mounted to the cooking trough 8, oil flowing into the outlet trough 180 will then flow towards the opening 182 (e.g., driven by gravity) and into the outlet circuit 24. The flow of oil through the oil outlet 84 is controlled by the outlet valve 41.

A baffle 175, in certain embodiments, controllably opens and closes (e.g., rotatably opens and closes) to regulate the amount of oil passing through the outlet 84. For example, the baffle 175 can be mechanically controlled by an automated temperature control system 101 (described below with reference to FIG. 8). If the baffle 175 is closed, no oil will flow through the outlet 84. If the baffle 175 is open to any extent, oil flows through the outlet trough 180.

In some embodiments, the baffle 175 has a fixed position and functions to provide a gentle transition for oil falling from the cooking trough 8 into the outlet trough 180.

The removal oil outlet 80 is not related to a cooking zone, but is instead an oil outlet intermediate the cooking trough 8 and the removal conveyor 13, wherein excess oil from the cooked chips can be drained. The outlet 80 is essentially a lateral trough at the distal end of the elongated cooking trough 8. The outlet 80 receives cooking oil draining from cooked chips as they are removed from the cooking trough 8 (e.g., by removal conveyor 13). Additionally, if the entire volume of cooking oil within the elongated trough is drained, the removal outlet 80 can be used alone, or in conjunction with other outlets. The flow of oil through the outlet 80 is controlled by an outlet valve 41.

The removal oil outlet 80, as well as oil outlets 82, 84, and 86, all are controllably in fluid communication with the oil outlet circuit 24. Control of oil outlet flow is provided by at least one outlet valve 41. Preferably, each cooking zone has its own outlet valve 41 (e.g., intermediate outlet circuit 24 and each of oil outlets 82, 84, and 86, as illustrated in FIG. 5). Outlet valves 41 are known to those of skill in the art, and may include electrically or pneumatically actuated butterfly valves.

Oil provided to the oil outlet circuit 24 is directed to the drum filter 22, wherein the oil is filtered to remove particulates and other impurities before being recycled into the heat exchanger 28 via the pump 26.

It will be appreciated that cooking oil in an oil flow system 100 such as that provided herein can be used for more cooking cycles than in a traditional kettle fryer system, due to the precise, location-based, temperature control provided by the heat exchanger 28 as well as the cooking zones 32, 34, and 36.

As described above, during a cooking process, the cooking trough 8 is partially filled with cooking oil, typically provided by oil inlets 94. After the raw potato slices have been fed into cooking trough 8, the stirrer 12 moves longitudinally along the cooking trough 8 while the paddle rake 70 agitates the potato slices cooking in the oil. The stirrer 12 travels the longitudinal distance of the cooking trough 8 a single time or several times, and the paddle rake 70 can be rotated in only a single rotational direction or in multiple rotational directions over the course of the cooking cycle. Upon completion of a cooking cycle, the gate 64 is removed (e.g., folded down), and the oil is drained from the cooking trough 8. The paddle rake 70 may be used to assist in agitating and moving the cooked kettle chips toward the removal conveyor 13 for removal of the cooked kettle chips to further processing.

Figure 8:
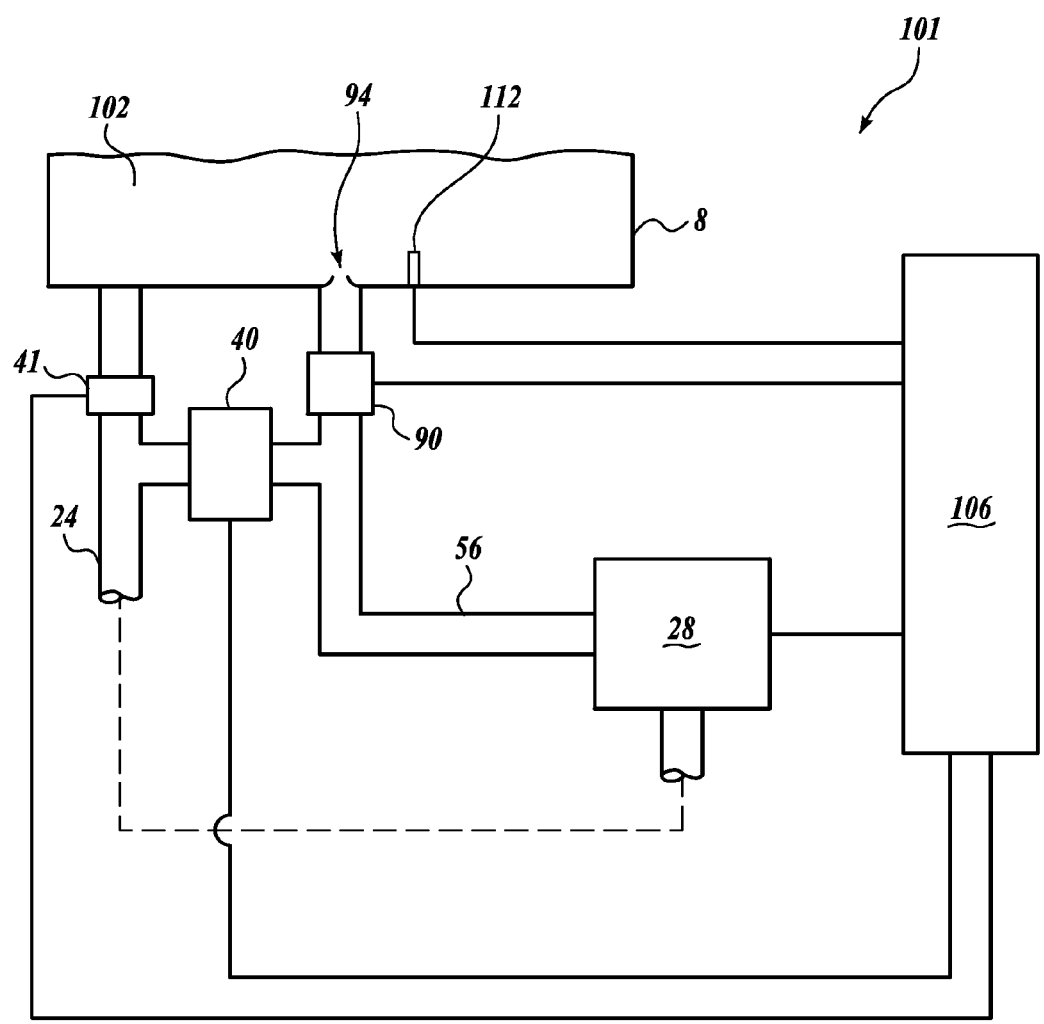
FIG. 8 is a schematic representation of a system for controlling the temperature of cooking oil in a batch cooker in accordance with the embodiments provided herein.

Referring now to FIG. 8, a temperature control system 101 for cooking oil 102 in a cooking trough 108 is schematically illustrated. Such a temperature control system 101 is preferably integrated with a batch cooker 50, as described herein. In the temperature control system 101, a control unit 106 allows for control of, and (optionally) automation of, the cooking oil 102 temperature and kettle chip cooking process within the batch cooker 50.

The control unit 106 is in electronic communication with a number of components of the control system 101, including at least one temperature sensor 112; an inlet valve 90; a bypass valve 40; an outlet valve 41; and a heat exchanger 28.

The temperature of the cooking oil 102 is determined using temperature sensor 112. Temperature sensors contemplated by the present embodiments are known to those of skill in the art. In a representative embodiment, thermal probes are used as temperature sensors 112. In one embodiment, the temperature sensors 112 are positioned at the oil outlets 82, 84, and 86.

The desired temperature (or temperature profile over a period of time) is input into the control unit 106. The control unit 106 determines the appropriate temperature of the cooking oil 102 and adjusts, or maintains, the temperature of the cooking oil 102 accordingly.

The control unit 106 controls the temperature of the cooking oil 102 though several components. As described above, the heated cooking oil from the heat exchanger 28 is generally directed into the cooking trough 8 while cooking oil is simultaneously drained from the cooking trough, so as to provide a constant flow of heated cooking oil for cooking kettle chips. However, the control system 101 is capable of changing the temperature of the cooking oil 102 more rapidly than if only the heat exchanger 28 was used.

The temperature at which the heat exchanger 28 provides heated cooking oil can be raised or lowered by the control unit 102. The temperature of the heated cooking oil leaving the heat exchanger 28 is the maximum cooking temperature of the cooking oil 102 in the cooking trough 8. Accordingly, the heat exchanger 28 should be set to provide cooking oil at the maximum desired cooking temperature. Other aspects of the control system allow for adjustments to lower temperatures.

If relatively brief changes in temperature are desired (e.g., to form the inverse bell curve for cooking kettle chips, a process on the order of a few minutes), the inlet valve 90 can be controlled to provide a reduced volume of heated cooking oil to the cooking trough 8 via inlet 94. Similarly, the bypass valve 40 can be controlled so as to allow heated cooking oil to bypass the cooking trough 8 entirely, thereby reducing the temperature of the cooking oil 102. Accordingly, if an immediate drop in the temperature of the cooking oil 102 is needed to provide the inverse bell curve temperature profile, the inlet valve 90 can be closed so as to stop the flow of heated cooking oil into the cooking trough. In this circumstance, the bypass valve 40 would be opened to accommodate the flow of heated cooking oil from the heat exchanger 28. Conversely, to raise the temperature, the bypass valve 40 is closed and the inlet valve 90 is opened, which allows heated cooking oil to flow into the cooking trough 8 once again.

So as to control the level of cooking oil 102 in the heating trough, the control unit 106 also operates the outlet valve 41 to control the amount of cooking oil 102 passing from the cooking trough 8 to the outlet circuit 24. For example, if a constant volume of cooking oil 8 is desired, closing the inlet valve 90 will require a similar closing of the outlet valve 41. The outlet circuit 24 routes cooking oil back to the heat exchanger 28.

While essentially only a single cooking zone is illustrated in FIG. 8, it will be appreciated that in a batch cooker 50 having a plurality of cooking zones (e.g., 32, 34, and 36), each zone may include one or more temperature sensors 112 to provide cooking oil temperature input to the control unit 106. In such a system, the control unit 106 may control each cooking zone 32, 34, and 36 discretely based on the measured local temperature of the zone. Accordingly, heated oil may be added to one zone, but not the others, for example.

So as to provide the desired temperature profile for cooking kettle chips over an entire cooking period, the control system 106 can also be integrated with means for supplying raw potato slices (e.g., from an infeed delivery system 51 as illustrated in FIG. 3) so as to feed into the cooking trough 8 a particular amount of potato slices for cooking. The control unit 106 then directs a stirrer 12 in a preprogrammed fashion to agitate the cooking kettle chips. The temperature control provided by the control unit 106 is configured to produce an inverse bell-shaped curve, as required for cooking kettle chips. Upon conclusion of the cooking process, the control unit 106 controls the batch cooker 50 to direct the cooked kettle chips to the removal conveyor 13 (e.g., using the paddle rake 70 and the stirrer 12) as well as to drain the cooking oil, if so desired, for cleaning using the drum filter 22. Alternatively, the oil can be reused without cleaning for a number of separate cooking batches of kettle chips.

In certain embodiments, the control unit 106 is an electronic control unit. Such an electronic control unit can be either digital or analog, and can be controlled by a computer, manually, or in any other manner known to those of skill in the art.

It will be appreciated that several batch cookers 50 can be integrated into a single system configured to automate the kettle chip cooking process.

Figure 2:
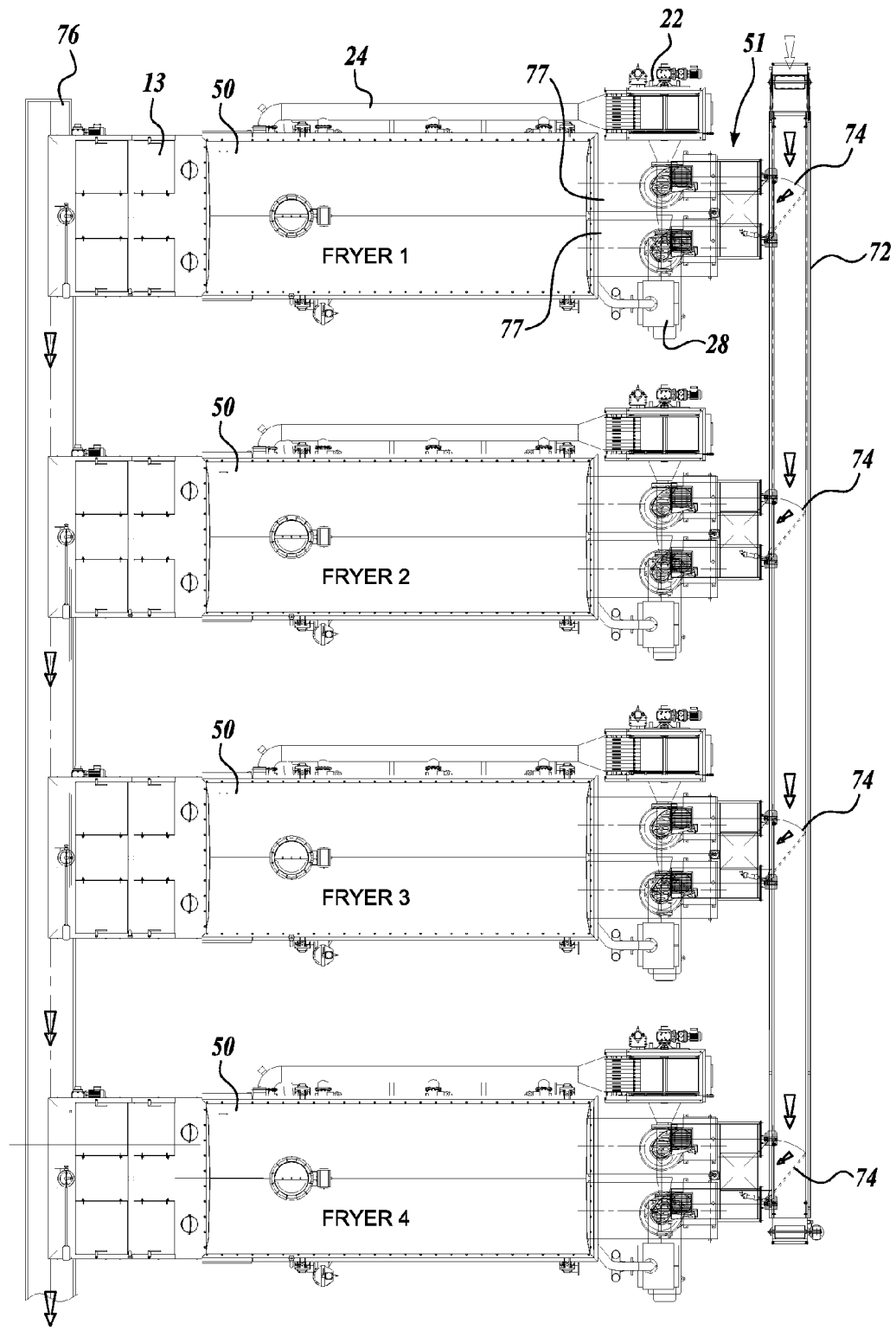
FIG. 2 is a plan view showing a series of four batch cookers in accordance with the embodiments disclosed herein.

As illustrated in FIG. 2, four batch cookers 50 are integrated into an automated system whereby raw potatoes can be fed into each batch cooker 50 in a process that begins with a belt conveyor 72 connected to a source of raw potatoes. Diverter gates 74 swing open to direct potatoes to a batch cooker 50 as needed.

The potatoes are sliced and fed into a batch cooker 50 via an infeed conveyor 77. Upon cooking, a removal conveyor 13 removes the cooked kettle chips and directs the chips to a distribution system belt conveyor 76 for further processing (e.g., seasoning and packaging).

Referring to FIG. 3, an elevation view of a single batch cooker 50 of the system of FIG. 2 is illustrated. The infeed delivery system 51 includes an elevated hopper 71 containing raw potatoes. The hopper 71 distributes potatoes to an underlying belt conveyor 72 as needed. The potatoes are removed from the belt conveyor using a diverter gate 74 after which the potatoes fall down a chute and into an auger 75. The auger 75 drives the potatoes horizontally into a powered cutter 78, which cuts the potatoes and deposits the sliced potatoes onto one or more infeed conveyors 77 associated with a batch cooker 50. The infeed conveyor 77 conveys the raw potato slices through the infeed 60 and into the batch cooker 50 for cooking.

In another aspect, methods for cooking kettle chips using the batch cooker 50 described above are provided.

In one embodiment, a method is provided comprising the following steps:

(a) delivering raw potato slices into a volume of cooking oil in the cooking trough, wherein said volume of cooking oil is heated by a heat exchanger to a first temperature;

(b) decreasing the temperature of the volume of cooking oil to a second temperature when the raw potato slices are delivered into the volume of cooking oil;

(c) increasing the temperature of the volume of cooking oil to a third temperature to provide cooked potato slices after a cooking period; and (d) removing the cooked potato slices from the volume of cooking oil using the means for removing cooked potato slices from the cooking trough, to provide cooked kettle chips.

In the method, the step of delivering raw potato slices into a volume of cooking oil in the cooking trough can be accomplished, for example, by feeding raw potatoes into an infeed delivery system 51, as illustrated in FIG. 3. Other means of providing raw potato slices to the batch cooker 50 can also be utilized, such as to provide the raw potato slices to an infeed conveyor 77 for delivery to the cooking trough 8 via the infeed 60.

In the method, the volume of cooking oil is heated by heat exchanger 28. The first temperature is provided as uniformly as possible throughout the cooking trough. Such uniform temperature control can be achieved, for example, using the three cooking zones 32, 34, and 36, and the related temperature sensors and inlet valves 90 for providing the appropriate amount of heated oil from the heat exchanger 28 to the cooking zones 32, 34, and 36.

The method proceeds with a step of decreasing the temperature of the volume of cooking oil to a second temperature when the raw potato slices are delivered to the volume of the cooking oil. This step of the method satisfies the requirement for kettle-style potato chips wherein the temperature profile of the cooking oil is an inverse bell curve beginning when the temperature decreases upon addition of the raw potato slices and then gradually increases to a steady cooking temperature. Such an inverse bell curve temperature profile is accomplished in known kettle-style cooking methods by simply adding raw potato slices to heated oil. The cool temperature of the raw potato slices, as well as the moisture contained within the potato slices, results in a decrease of the temperature of the cooking oil, so as to produce the inverse bell curve. In the present embodiments, the addition of raw potato slices to the volume of cooking oil may provide some decrease in the temperature of the cooking oil. However, the use of the cooking zones 32, 34, and 36, and the temperature control system 101 are used to provide a highly-controlled inverse temperature profile, such that the temperature of the cooking oil can be reduced by a greater or lesser amount than as would result from adding raw potato slices.

Accordingly, the properties of the cooked kettle chips may be controlled to a greater degree using the batch cooker 50 and the methods provided herein, when compared to traditional kettle cookers. For example, the hardness, bite, and other properties of the cooked kettle chips may be controlled by providing a greater or lesser temperature change than would be produced by simply adding raw potato slices to the volume of cooking oil.

Deviations from an optimum temperature-cooking time profile will cause soft centers (under cooked) chips, over cooked chips, or chip that do not have the bite/hardness that is desired.

In one embodiment, decreasing the temperature of the volume of cooking oil to the second temperature comprises reducing or terminating the flow of heating the volume of cooking oil in the cooking trough by the heat exchanger. Such a reduction or termination of the flow of heating oil can be effected using the inlet valves 90 located in the cooking zones 32, 34, and 36, as well as using the bypass valve 40 to completely bypass the cooking trough 8 so as to eliminate heating of the oil completely.

The method continues with a step of increasing the temperature of the volume of cooking oil to a third temperature. In this step, control system 101, the heat exchanger 28, and the cooking zones 32, 34, and 36 are used to raise the temperature of the volume of cooking oil containing the cooking potato slices. In traditional kettle-style cooking systems, the temperature raise is produces by continuous application of heat (e.g., flames) to the cooking vessel, which eventually overcomes the temperature decrease resulting from addition of raw potato slices, and returns the cooking oil to the pre-addition temperature for a set period of time in which the potato slices continue to cook until finished. In the present method, the speed at which the temperature raises from the second temperature to the third temperature can be controlled precisely using the heat exchanger 28 and the cooking zones 32, 34, and 36. The control afforded by the batch cooker 50 allows for further control over the finished properties of cooked kettle chips. For example, the temperature can be raised more quickly to the third temperature than in traditional kettle cookers.

In certain embodiments, the third temperature is the same as or similar to the first temperature. Such a cooking temperature profile resembles that of traditional kettle-style cooking systems wherein an initial oil temperature is decreased by the addition of raw potato slices and then heat is applied to return the temperature of the cooking oil to the initial oil temperature. However, in certain embodiments of the method, the third cooking temperature is different than the first cooking temperature. The use of the heat exchanger 28 allows for more control over the available ranges of cooking temperatures for the oil during the kettle chip cooking process when compared to traditional flame-heat kettle-style cooking systems. Accordingly, the third cooking temperature may be hotter than or cooler than the first temperature of the cooking oil. The properties of the cooked kettle chips may be affected by such a difference between the first temperature and the third temperature. Therefore, this feature provides an additional degree of control over the final characteristics of a cooked kettle chip.

After a period of time cooking the potato slices in the cooking oil at the third temperature, the potato slices are fully cooked and become kettle chips. The cooking period is determined by the operator of the batch cooker 50 according to the desired properties of the cooked kettle chips.

Upon expiration of the cooking period, the cooked potato slices (i.e., kettle chips) are removed from the volume of cooking oil. A means for removing cooked potato slices from the cooking trough are used in this step of the method. As described above, in the exemplary batch cooker 50, a stirrer 12 that includes a paddle rake 70 and a removable conveyor 13 are used to remove the cooked kettle chips. However, it will be appreciated that other means for removing cooked potato slices can be used. For example the chips can be removed by hand (e.g., a person raking the chips out of the fryer).

In another aspect, a method for cooking kettle chips is provided. In one embodiment, the method provides the steps of:

a) delivering heated cooking oil to an elongated cooking trough, said cooking oil being heated by a heat supply positioned at a location distal from the cooking trough;

b) delivering raw potato slices into the cooking oil in the elongated cooking trough with the cooking oil heated to a first temperature;

c) decreasing the temperature of the cooking oil in the cooking trough to a second temperature when the raw potato slices are delivered to the cooking trough by altering the flow of cooking oil to the cooking trough;

d) increasing the temperature of the cooking oil in the cooking trough to a third temperature to provide cooked potato slices after cooking, by altering the flow of heated cooking oil to the cooking trough; and e) removing the cooked potato slices from the cooking oil in the cooking trough, thereby to provide cooked kettle chips.

While the batch cooker 50 described herein can be used to perform the methods of this aspect, the methods are not limited to such an apparatus.

In the first step of the method, heating oil is delivered to an elongated cooking trough from a heat supply positioned at a location distal from the cooking trough. Accordingly, the traditional kettle-style cooking system, which utilizes direct-flame heating of a cooking vessel, is not compatible with the methods of this aspect. Instead, a distal heat supply provides heated cooking oil. For example, a heat exchanger 28 of the batch cooker 50 described herein. It will be appreciated that other types of heat supplies are contemplated by the present embodiments.

In the next step of the method, raw potato slices are delivered into the cooking oil, which is heated to a first temperature. Delivery mechanisms, such as those known to those of skill in the art, are contemplated by the present embodiments. For example, a conveyor belt (such as infeed conveyor 77) can be used, in addition to other delivery mechanisms.

In the next step of the method, the temperature of the cooking oil is decreased to a second temperature when the raw potato slices are delivered to the cooking trough. In certain embodiments, this decrease in temperature is affected not only by the addition of the raw potato slices, but also by altering the flow of cooking oil to the cooking trough. For example, by bypassing the cooking trough when delivering heated oil from the heat supply. In the context of the batch cooker 50, opening of the bypass valve 40 while closing the inlet valves 90 in each of the cooking zones 32, 34, and 36, will alter the flow of cooking oil to the cooking trough. Additionally, some flow through the inlet valves 90 is possible, although such flow should be minimal, and only to maintain the decreased second temperature of the cooking oil within the cooking trough.

In the next step of the method, the temperature of the cooking oil is increased to a third temperature to provide cooked potato slices after cooking. The increase of the temperature of the cooking oil to the third temperature is produced by altering the flow of heated cooking oil to the cooking trough. For example, in the batch cooker 50, the bypass valve 40 can be partially closed, or entirely closed, while the inlet valves 90 are partially opened, or completely opened, to allow heated cooking oil from the heat supply to enter the cooking trough, thereby raising the temperature of the cooking oil to the third temperature.

In the final step of the method, cooked potato slices are removed from the cooking trough, thereby providing cooked kettle chips. Removing the cooked potato slices may include mechanisms, such as a stirrer 12 and paddle rake 70 of the batch cooker 50, as well as a removal conveyor 13. However, it will be appreciated that other mechanisms for removing cooked potato slices from the cooking oil are also contemplated (e.g., by hand).

While illustrative embodiments have been illustrated and described, it will be appreciated that various changes can be made therein without departing from the spirit and scope of the invention.

The embodiments of the invention in which an exclusive property or privilege is claimed are defined as follows:

1. A batch cooker, comprising:
   a cooking trough divided into a plurality of temperature zones that is configured to hold a volume of heated cooking oil; and
   an oil recirculation system in fluid communication with the cooking trough divided into the plurality of temperature zones, comprising:
   a heat exchanger configured to heat cooking oil flowing through the heat exchanger, an oil inlet circuit intermediate, and in fluid communication with, the heat exchanger and the cooking trough divided into the plurality of temperature zones,
   one or more inlet valves intermediate, and in fluid communication with, the oil inlet circuit and the cooking trough divided into the plurality of temperature zones, wherein each temperature zone comprises an inlet valve in fluid communication with one or more oil inlet openings configured to control an amount of oil passing from the circuit to the cooking trough, and a temperature sensor configured to measure a temperature of a portion of the volume of cooking oil adjacent to the one or more inlet openings,
   one or more oil outlets configured to remove oil from the cooking trough,
   an oil outlet circuit in oil flow communication with said oil outlets,
   an oil filter intermediate, and in fluid communication with, the oil outlet circuit and the heat exchanger,
   a bypass valve in fluid communication with the oil inlet circuit, said bypass valve being configured to control an amount of oil passing from the oil inlet circuit, through a bypass conduit, and to the oil outlet circuit without passing through the cooking trough, and
   an oil pump configured to pump oil through the oil recirculation system.

2. The batch cooker of claim 1, wherein the one or more oil inlet openings are further configured to deliver heated oil to the cooking trough.

3. The batch cooker of claim 2, wherein the oil inlet openings are oil inlet nozzles.

4. The batch cooker of claim 3, wherein the oil inlet nozzles are positioned to direct a flow of inlet oil in a selected direction.

5. The batch cooker of claim 1, wherein the oil outlets are disposed in oil flow communication with an oil outlet valve, said outlet valve configured to control an amount of oil leaving the cooker through the oil outlet.

6. The batch cooker of claim 1, further comprising a hood configured to close over and form a vapor-tight seal with the cooking trough.

7. The batch cooker of claim 6, wherein the hood is retractable relative to the cooking trough.

8. The batch cooker of claim 1, further comprising temperature sensors configured to measure a temperature of the volume of cooking oil in the cooking trough.

9. The batch cooker of claim 1, further comprising a control unit configured to automatically adjust an oil temperature of cooking oil in the cooking trough, said control unit configured to:
   receive temperature input from one or more temperature sensors;
   control a temperature to which the heat exchanger heats the cooking oil;
   control an amount of cooking oil passing through the one or more inlet valves; and
   control an amount of cooking oil passing through the bypass valve.

10. The batch cooker of claim 9, wherein the control unit is further configured to control an amount of cooking oil passing through the outlet.

11. The batch cooker of claim 9 wherein the control unit is a digital electronic control unit controlled by a computer.

12. The batch cooker of claim 11 wherein the control unit is integrated with the batch cooker.

13. The batch cooker of claim 12 wherein the control unit is further configured to receive a desired temperature or temperature profile over a period of time, and wherein control of the temperature to which the heat exchanger heats the cooking oil is accordingly based on the desired temperature or temperature profile over the period of time.

\* \* \* \* \*